(12) United States Patent
Malek et al.

(10) Patent No.: US 7,361,619 B2
(45) Date of Patent: Apr. 22, 2008

(54) FISCHER-TROPSCH CATALYST PRODUCTION

(75) Inventors: Andrzej M. Malek, Doylestown, PA (US); Stephen C. Leviness, Tulsa, OK (US); Horacio M. Trevino, Annandale, NJ (US); Weldon K. Bell, Ridgeway, IA (US); David O. Marler, Morris Plains, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 481 days.

(21) Appl. No.: 10/819,379

(22) Filed: Apr. 6, 2004

(65) Prior Publication Data

US 2004/0204505 A1    Oct. 14, 2004

Related U.S. Application Data

(60) Provisional application No. 60/462,016, filed on Apr. 11, 2003.

(51) Int. Cl.
   *B01J 20/34*   (2006.01)
   *B01J 21/20*   (2006.01)
   *B01J 23/00*   (2006.01)
   *B01J 25/04*   (2006.01)
   *B01J 27/28*   (2006.01)

(52) U.S. Cl. ................ 502/20; 502/324; 502/326; 502/335; 502/337; 502/319; 502/305; 502/321; 502/350; 502/339

(58) Field of Classification Search .......... 502/20, 502/324, 326, 335, 337, 350, 319, 321, 305, 502/339
See application file for complete search history.

(56) References Cited

U.S. PATENT DOCUMENTS

| | | | |
|---|---|---|---|
| 2,583,619 A | 1/1952 | White | 252/477 |
| 3,244,682 A * | 4/1966 | Czenkusch et al. | 526/95 |
| 3,641,096 A * | 2/1972 | Jaffe et al. | 502/64 |
| 3,661,798 A | 5/1972 | Cosyns et al. | 252/416 |
| 4,089,812 A | 5/1978 | O'Hare et al. | 252/466 |
| 4,399,234 A | 8/1983 | Beuther et al. | 518/715 |
| 4,492,774 A | 1/1985 | Kibby et al. | 518/713 |
| 4,585,789 A | 4/1986 | Okamoto et al. | 514/461 |
| 4,670,414 A | 6/1987 | Kobylinski et al. | 502/174 |
| 4,826,799 A | 5/1989 | Cheng et al. | 502/301 |
| 4,895,994 A | 1/1990 | Cheng et al. | 585/270 |
| 4,910,175 A | 3/1990 | Michel et al. | 502/24 |
| 4,977,126 A | 12/1990 | Mauldin et al. | 502/242 |
| 5,168,091 A | 12/1992 | Behrmann et al. | 502/325 |
| 5,260,239 A | 11/1993 | Hsia | 502/30 |
| 5,268,344 A | 12/1993 | Pedrick et al. | 502/30 |
| 5,283,216 A | 2/1994 | Mitchell | 502/30 |
| 5,292,705 A | 3/1994 | Mitchell | 502/325 |
| 5,382,748 A | 1/1995 | Behrmann et al. | 585/899 |
| 5,536,694 A | 7/1996 | Schuetz et al. | 502/301 |
| 5,928,983 A * | 7/1999 | Culross | 502/170 |
| 6,030,915 A * | 2/2000 | de Boer | 502/39 |
| 6,323,248 B1 * | 11/2001 | Mart et al. | 518/709 |
| 6,465,529 B1 * | 10/2002 | Daage et al. | 518/709 |
| 6,531,517 B1 * | 3/2003 | Wachter et al. | 518/709 |
| 6,531,518 B1 | 3/2003 | Lapidus et al. | 518/709 |
| 6,624,204 B1 * | 9/2003 | Daage et al. | 518/709 |
| 6,642,281 B1 * | 11/2003 | Long et al. | 518/709 |
| 6,695,502 B2 * | 2/2004 | Marsh | 400/624 |
| 7,122,491 B2 * | 10/2006 | Barton et al. | 502/20 |
| 2004/0058807 A1 * | 3/2004 | Werpy et al. | 502/180 |

FOREIGN PATENT DOCUMENTS

| WO | WO 98/33589 | 8/1998 |
|---|---|---|
| WO | WO 02/20700 A2 | 3/2002 |
| WO | WO 2004/060836 A1 | 7/2004 |

OTHER PUBLICATIONS

Suslick et al, "Sonochemical Synthesis of Amorphous Iron", Nature, vol. 353, Oct. 3, 1991, pp. 414-416.
Gibson et al, "Synthesis and Characterization of Anisonmetric Cobalt Nanoclusters", Science 1338, vol. 267, No. 5202, Mar. 3, 1995.
Potoczna-Petru et al., "Influence of Oxidation-Reduction Treatment on the Microstructure of Co/$SiO_2$ Catalyst", Applied Catalysis A: General 175 (1998) pp. 113-120.
Savelov et al., "Role of Alloying Metals in Raney Ni, Co, and Cu Catalysts", Russian Journal of Physical Chemistry, vol. 62 (11), pp. 1537-1540, (1988).

* cited by examiner

*Primary Examiner*—Cam N. Nguyen
(74) *Attorney, Agent, or Firm*—Estelle C. Bakun

(57) ABSTRACT

Dispersed Active Metal catalyst for hydrogenation reactions is produced by treating a substantially catalytically inactive metal particulate with a solution capable of oxidizing the metal particulate and comprising of at least one compound of a hydrogenation catalyst metal thereby forming a layer of at least one of hydroxides and oxides thereon. The metal particulate is activated by treatment with a hydrogen-containing gas at elevated temperatures to form a porous layer of Dispersed Active Metal catalyst. Preferably, the treated metal particulate is dried prior to activation, and also preferably calcined in an oxidant-containing atmosphere prior to activation. The treatment solution may advantageously contain a compound of at least one promoter metal for the added catalyst metal. The porosity of the layer provides enhanced catalyst activity as well as improved methane selectivity in the Fischer-Tropsch process.

11 Claims, No Drawings

FISCHER-TROPSCH CATALYST PRODUCTION

This application claims the benefit of U.S. Provisional Application No. 60/462,016 filed Apr. 11, 2003.

This invention relates to a process for the production of dispersed active metal catalysts for hydrogenation reactions. More particularly, the invention relates to the production of Fischer-Tropsch metal catalysts by treating a metal particulate, such as cobalt to render it catalytically active.

BACKGROUND OF THE INVENTION

The production of higher hydrocarbon materials from synthesis gas, i.e. carbon monoxide and hydrogen, commonly known as the Fischer-Tropsch is ("F-T") process, has been in commercial use for many years. Such processes rely on specialized catalysts. The original catalysts for the Fischer-Tropsch synthesis were nickel. Nickel is still the preferred catalyst for hydrogenation of fats and specialty chemicals. Over the years, other metals, particularly iron and cobalt, have become preferred in the Fischer-Tropsch synthesis of higher hydrocarbons whereas copper has been the catalyst of choice for alcohol synthesis. Cobalt is particularly preferred for Fischer-Tropsch synthesis due its high productivity and comparatively low methane selectivity. As the technology of these syntheses developed over the years, the catalysts have become more refined and have been augmented by promoters in the form of metals or those corresponding metal oxides that function to promote their catalytic activity. Promoter metals or metal oxides include, without intended limitation, Re, Ru, Os, Ir, Mo, W, Cu, Si, Cr, Ti, Mg, Mn, Zr, Hf, Al, Th and the like. It is generally recognized that the choice of a particular metal or alloy for fabricating a catalyst to be utilized in Fischer-Tropsch synthesis will depend in large measure on the desired product or products.

In 1924, M. Raney prepared a nickel hydrogenation catalyst by a process known today as the Raney Process. For purposes of simplicity, the term "Raney" will be utilized herein as a generic term to describe the process, alloys and catalysts obtained thereby. This specific synthesis, in essence, comprises forming at least a binary alloy of metals, at least one of which can be extracted, and extracting it thereby leaving a porous residue of the non-soluble metal or metals that possess catalytic activity. The residue, or non-extractable, catalyst metals are the art-recognized group of metals described above such as Co, Ni and Ru. The extractable metals, typically aluminum, are likewise an art-recognized group. Once alloys are formed of at least one member of each of these groups of metals, they are ground to a fine powder and treated with strong caustic, such as sodium hydroxide, to leach the extractable metal from the residue metal or metals.

There exist many variations of the basic preparation of Raney catalysts such as, for example, deposition of alloys onto a preformed support by flame spraying, (U.S. Pat. No. 4,089,812), formation of the alloy by surface diffusion of aluminum on a non-leachable metal substrate (U.S. Pat. No. 2,583,619), and forming pellets from the powdered alloys for use in fixed bed reactions vessels (U.S. Pat. No. 4,826,799, U.S. Pat. No. 4,895,994 and U.S. Pat. No. 5,536,694). These developments have made possible the use of shaped Raney catalysts in fixed bed reaction vessels. Although Raney catalysts are Dispersed Active Metals ("DAM") they differ significantly from the DAM catalysts described herein.

Particularly suited for the production of hydrocarbons by Fischer-Tropsch synthesis from synthesis gas are DAM catalysts which are primarily, i.e. at least about 50 wt. %, preferably at least 80 wt. %, composed of one or a mixture of metals such as Co, Fe, Ni, Ru and Cu and are, without further treatment, capable of catalyzing Fischer-Tropsch synthesis. DAM catalysts may be prepared by any of a number of art-recognized processes. An extensive review of process of forming DAM catalysts can be found in "Active Metals", Edited by Alois Furstner, published by VCH Verlagsgesellschaft mbH, D-69451 Weinheim (FRG) in 1996 and the references cited therein. Methodologies described therein include the Reike method, the use of ultrasound, reduction of metal salts, colloids, nanoscale cluster and powders. Other relevant references include, for example, the preparation of amorphous iron catalyst by high intensity sonolysis of iron pentacarbonyl, Suslick et al., Nature, Vol. 353, pp 414-416 (1991) and the formation of single domain cobalt clusters by reduction of a cobalt salt with hydrazine, Gibson et el., Science, Vol. 267, pp 1338-1340, (1998). Finally, intermetallic alloys, particularly those known for forming metal hydrides, such as $LaCo_5$, can be formed into a fine powder by the application of hydrogen adsorption/desorption cycles. Such catalysts can also be prepared by thermal or chemical decomposition of metal formates or oxalates.

It will be appreciated that a means of producing DAM catalysts having enhanced activity for hydrogenation reactions would be of significant value. In particular, an important aspect of the value of a catalyst for the Fischer-Tropsch process, in addition to its activity, is its selectivity. This property, commonly referred to as "methane selectivity", is the ratio of the percent of feed material converted to desired higher hydrocarbons to that of short chain hydrocarbons produced, primarily methane. In accordance with the present invention, it has been found that DAM catalysts possessing enhanced activity and methane selectivity can be produced from metal particulates, by a process that is both simple and economical.

SUMMARY OF THE INVENTION

In accordance with the present invention, catalysts useful in the hydrogenation of CO such as in the Fischer-Tropsch process are produced by treating a metal particulate with a solution capable of oxidizing the metal particulate and comprising at least one compound of a hydrogenation catalyst metal, the treatment being in an amount and for a time sufficient to form at least one of metal hydroxides and oxides on at least a portion of the metal particulate. After treatment with the solution, the modified particles are preferably dried and then activated by treatment at high temperatures with a hydrogen-containing gas thereby forming an active catalyst. In a preferred embodiment, the metal particle comprise a catalytic metal thereby providing a unique catalyst comprising a core of a catalytic metal particulate having on at least a portion of the surface of the particulate a porous layer of an active metal catalyst.

The process results in Dispersed Active Metal ("DAM") catalysts possessing enhanced catalytic activity.

Other embodiments will become apparent upon reading the detailed description which follows:

DETAILED DESCRIPTION OF THE INVENTION

It is recognized in the art of Fischer-Tropsch synthesis chemistry that Group VIII metal surfaces exhibit higher activities for catalytic reactions such as hydrogenation, methanation and Fischer-Tropsch synthesis when subjected to a high temperature oxidation-reduction (O-R) cycle. Such "activation" techniques are reviewed in Applied Catalysis, A. General 175, pp 113-120 (1998) and citations therein. A series of patents, e.g. U.S. Pat. Nos. 4,492,774; 4,399,234; 4,585,789 and 4,670,414 disclose activation of a cobalt catalyst by a reduction/oxidation/reduction (R-O-R) cycle. So far as we are aware, all such oxidation/reduction and reduction/oxidation/reduction cycles described in the literature are effected by treating a supported metal catalyst with an oxygen-containing gas at high temperatures. Metals useful as catalysts in the processes described above are characterized by the capacity to form more than one oxide. Treatment of such metals by either the O-R or R-O-R process results in the formation of the most stable oxide of the metal, for example, in the instance of cobalt, $Co_3O_4$ is formed. For this reason the O-R and R-O-R processes are utilized to activate and enhance the activity of commercial catalysts.

In contrast to the treatment of commercial catalysts as described above, the present invention has an object the formation of a highly active, selective catalyst layer on a metal particulate or particulates. The metal particulates treated in accordance with the present invention are those which are not substantially resistant to oxidation.

Typically the metal particulates are selected from the group consisting of cobalt, zinc, aluminum, manganese, molybdenum, tungsten, chromium, copper, nickel, ruthenium, steel, alloys and mixtures thereof. Cobalt, nickel and ruthenium are preferred with cobalt being especially preferred. While it is possible to utilize particulates of more than one of the foregoing group of metals as substrates, generally a single metal will be utilized in the subject process. Although the metal particulate may be in any one of a variety of forms, it is preferred that the particulate be in the form of particles or powder in the size range of generally from about 0.1 micron to 5 millimeters, preferably from about 1 to 50 microns. For non-spheroid particulates such as oval particulates the size range is for the particulates smallest thickness. It is also preferred to have the metal particulates treated to be of a relatively uniform particle size.

In accordance with the present invention, the metal particles are treated with a solution capable of oxidizing the metal particulates and comprising at least one compound of a metal that will catalyze hydrogenation reactions. Obviously the solution must be free of any material that would poison the final catalyst.

Suitable compounds containing a metal that will catalyze hydrogenation reaction preferably are selected from the group of metals including but not limited to cobalt, ruthenium and nickel, with cobalt and ruthenium being especially preferred. In a particularly preferred embodiment of the present process, the metal of the compound and the substrate metal particulates are the same, most preferably cobalt. Various promoter metals that may also be included in the treatment solution in the form of their soluble compounds, preferably their salts. Such promoter metals include, without intended limitation, manganese, zinc, titanium, molybdenum, chromium, tungsten, rhenium, ruthenium, palladium and platinum. Examples of suitable compounds include nitrates, nitrosyl salts, nitrites, permanganates, carboxylates, various chelates and the like. Particularly preferred among such compounds are those that also function as oxidants, e.g. a salt such as cobalt nitrate. Thus, the oxidants present in the oxidizing solution include, without intended limitation, nitrates, nitrites, nitrosyl compounds, peroxides and the like. Although organic oxidants can be utilized in the process of the present invention, generally inorganic oxidants, such as the nitrates, are preferred. As a general matter, the amount of the compounds of catalyst metals and promoter metals, if present, as well as the oxidant in the treatment solution, will be governed by the solubilities of each in the solvent utilized. It is within the scope of the present invention to utilize more than one of each category of ingredient to take advantage of relative solubilities or capacities of each. A treatment solution will typically contain a sufficient amount of dissolved ingredients to provide from about 10 ppm to 20 percent by weight of the catalyst metal and oxidant. Preferably, the solution will contain from about 1 to 15 weight percent of the catalyst metal and from about 0.1 to 5 weight percent of the promoter metal.

The choice of solvent for the oxidizing solution is dependent primarily on the capacity to dissolve the desired compounds, which preferably are salts. The preferred solvent is water, however, other solvents, e.g. certain organic solvents, may be combined therewith provided that they do not introduce any known catalytic poison and that are non-reactive with the conditions of the treatment. Mixtures of water and organic solvents miscible therewith can be utilized as well as mixtures of water with immiscible solvents in combination with suitable dispersing or emulsifying agents present to form a continuous phase, i.e. an emulsion. Such other suitable solvents include hydrocarbons, particularly those derived from the Fischer-Tropsch synthesis, supercritical fluids such as liquid phase light hydrocarbons, i.e. $C_{3-5}$ alkanes, cyclopentane and the like. Preferred mixed solvents include, without any intended limitation, water/lower alkanols, water/Fischer-Tropsch products, and water/alkanols/alkanes.

The treatment with the oxidizing solution is carried out by contacting the metal particulate with the oxidizing solution in an amount and for a time sufficient to form at least one of metal hydroxides and oxides on at least part of the surface of the metal particulate. The weight ratio of the oxidizing solution used to the metal particulate substrate can be varied from about 0.01:1 to 100:1, preferably from about 0.1:1 to 5:1. In the instance where the compound of catalyst metal in the solution is the same as the particulate metal, the above percentages are still based only on the solution. The contacting may be effected, among other methods, by drop-wise addition, by spraying the solution onto the metal particulate or by adding the latter to the solution.

The treatment described herein may be carried out in any reactor apparatus suitable for slurry reactions including, with no limitation intended, fixed bed reactors, moving bed reactors, fluidized bed reactors, slurry reactors, bubbling bed reactors and the like. The treatment will typically be carried out until the metal particulate has absorbed a volume of solution equal to at least about 10% of its calculated pore volume, preferably to where conditions of incipient wetness are attained. By incipient wetness is meant that the metal particulate has adsorbed an amount of solution generally equivalent to its calculated pore volume. Pore volume is a discernible quantity that can be measured directly or indirectly by known techniques such as porosimetry. The volume of impregnating solution contemplated will vary from 10% to 1,000% of the calculated pore volume of the catalyst. Preferably, the volume of treatment solution will be from 30% to 200%, most preferably from about 70% to 100% of the calculated pore volume of the catalyst. The treatment will typically require from 1 minute to 24 hours, preferably from about 5 to 60 minutes. The time required for the treatment will vary depending on factors such as the metal particulate being treated, the quantity thereof, the composition of the treatment solution, the reactor configuration and the like. The treatment is carried out at a temperature below about 100° C., preferably below about 50° C., and most preferably at room temperature, i.e. about 20-25° C. Certain of the reactions contemplated herein, e.g. those where nitrate salts are utilized, are exothermic. In those instances, the temperature is preferably controlled within the ranges given by controlling the rate of addition of the treatment solution. Alternatively, maintaining the concentration of the contemplated salts in the treatment solution at a comparatively low level will assure temperature control.

In any event the treated particles having the oxide or hydroxide layer tend to agglomerate where they contact each other. Thus the porous layer operates, in effect, to bind the treated particles together. In instances where the catalyst of the invention is to be used, for example, in a slurry bubble column or a fluid bed reactor, agglomerates of from about 10 microns to about 250 microns are preferred with agglomerates of from 10 to 100 microns being more preferred for fixed bed reactors larger sizes from 1/16 to 1/8 inch are preferred. The treated metal particles are then activated by reduction with hydrogen at elevated temperatures. There is thus produced a porous layer of active metal catalyst on at least a portion of the surface on the dense core of the metal particulate. The term "core" as used herein indicates that portion of the metal particulate that is not reacted with the activating solution. In a preferred embodiment, the treated particulate metal is calcined in an oxidant-containing atmosphere prior to the activation with a hydrogen-containing gas at elevated temperatures. The calcining enhances the metal oxide content of the layer on the surface of the particulate. The overall activity of the catalyst particles produced in accordance with the present process is, in part, dependent on the fineness of the metal particles utilized as a substrate, with the reduction in particle size corresponding to an increase in the final catalytic activity. The activity and selectivity of the catalyst particles formed in accordance with the present process is also enhanced by the addition of known promoter metals during the initial treatment step as will be further described below. Regardless of whether a promoter metal is added, the metal particles containing a layer of activated catalyst metal produced in accordance with the present invention are characterized by a significant improvement in both catalytic activity and methane selectivity in comparison to the original metal particulates. Additionally, when the metal particulate core is a catalytic metal such as Co, Ni and Ru, the resulting catalysts is distinguishable from conventional supported catalysts that are formed on a catalytically unreactive support material. It is also distinguishable form the Raney catalysts by the absence of residue of the extractable metal or its oxide. Excluding unreactive catalytic support or residue in this way from the catalyst composition is believed to be advantageous as it may limit undesired reactivity and simplify metal recovery from a spent catalyst by avoiding the necessary separation of metal form the conventional catalytic support.

The treatment may be carried out in a variety of atmospheres including, but not being limited to, air. An inert gas or an oxygen-containing gas may be utilized as well. Air or an oxygen-containing gas may be used to advantage in view of the nature of the reaction. The pressure of the treatment may be elevated as well, but for a practical matter, atmospheric pressure is preferred. There is formed in the initial treatment a layer comprising at least one of oxides and hydroxides, primarily the latter, of the metal particulate and of the metal of the metal compound and when more than one metal compound is used at least one of those metals. The layer is not necessarily contiguous like a coating and has a high degree of porosity after drying and/or calcination.

Once the treatment is concluded, the treated metal particles are preferably dried. Under certain conditions, e.g. where minimal treatment solution is utilized or where the reactions are exothermic as discussed above, it may not be necessary to dry the particles. Conversely, if the treatment is carried out in sufficient solution to warrant it, the particles are initially recovered, generally by physical separation, e.g. filtration or sieving. The drying procedure is carried out in a conventional oven, preferably at a temperature of from about 50° C. to 150° C. Again, although an inert atmosphere could be utilized, in view of the reactions described, drying may be carried out in air. Typically, from about 1 to 24 hours are required for the drying operation. It is preferred to continuously mix the treated metal particles during the drying operation. It is within the scope of the present invention to utilize vacuum drying to enhance the speed of the process, if so desired. The drying process may cause some additional agglomeration to take place among the particles. In the event that agglomerates in excess of the desired size range are formed they can be reduced and sized by conventional techniques such as grinding and screening. Preferably sizing will be conducted before the activation step described hereinafter.

The at least one of oxides and hydroxides in the porous layer of the metal particles according to the invention are then converted to a layer of dispersed active metal by reduction with hydrogen-containing gas at elevated temperatures, i.e. temperatures of from about 200° C. to 600° C., preferably from about 250° C. to 400° C. Hydrogen partial pressure during the reduction would range from about 0.01 to 100 atmospheres, preferably from about 0.1 to 40 atmospheres. The concentration of hydrogen in the hydrogen containing gas will be about 1% by volume, preferably 10 vol. % or more with the balance being an inert gas such as nitrogen. The process of the present invention is advantageous in that inexpensive metal powder, e.g. cobalt powder, that has no appreciable catalytic activity can be transformed into dispersed active metal catalyst particles having enhanced properties, both in terms of catalytic activity and methane selectivity.

In a preferred embodiment, the treated metal particles having a layer of at least one of oxides and hydroxides are calcined under an oxidant-containing atmosphere prior to the activation step. The atmosphere is preferably air, but may be an inert atmosphere containing a controlled amount of oxygen, e.g. such as would be produced as a product gas stream or a waste gas stream from an air separation plant. Such controlled oxidant-containing atmospheres would contain from 10 ppm to 21% by volume, preferably from about 1% to 21% by volume, oxygen with the remainder being a non-oxidative gas, preferably an inert gas, such as nitrogen. The gas flow in the furnace is from about 100 to 10,000, preferably from about 1,000 to 5,000 GSHV. The calcination is carried out at elevated temperatures, i.e. from about 150° C. to about 600° C., preferably from about 200° C. to 450° C., for from about 1 to 8 hours, preferably from 1 to about 4 hours.

Calcining of the dried particulate metal substrate in an oxidant-containing environment converts the salts and hydroxides of the metals in the layer formed in the initial treatment of the particulate metal substrate to oxides, although not necessarily to the highest oxidation state of the catalyst metal. For those metals that are capable of existing in more than one oxidation state, oxides of more than one state may be included in the surface layer. More importantly, calcination as described forms an oxide layer that is porous and can be reduced as described above to form a layer of one or more dispersed active metals.

The catalyst particles formed in accordance with the process of the invention are useful in synthesis processes for the formation of higher hydrocarbons wherein liquid and gaseous products are formed by contacting a syngas comprising a mixture of hydrogen and carbon monoxide with shifting or non-shifting conditions, preferably the latter in which little or no water gas shift takes place. The process is carried out at temperatures of from about 160° C. to 260° C., pressures of from about 5 atm to about 100 atm, preferably from 10 to 40 atm, and gas space velocities of from about 300 V/Hr/V to about 20,000 V/Hr/V, preferably from about 1,000 V/Hr/V to about 15,000 V/Hr/V. The stoichiometric ratio of hydrogen to carbon monoxide is about 2.1:1 for the production of higher hydrocarbons. This ratio can vary from about 1:1 to 4:1, preferably from 1.5:1 to 2.5:1, more preferably from 1.8:1 to 2.2:1. These reaction conditions are well known in the industry and a particular set of reaction conditions can readily be determined from the parameters given herein. The reaction may be carried out in virtually any type of reactor, e.g. fixed bed, moving bed, slurry bubble column, fluidized bed and the like. The hydrocarbon-containing products formed in the process are essentially sulfur and nitrogen free.

The hydrocarbons produced in a process as described above are typically upgraded to more valuable products by subjecting all or a portion of the $C_{5+}$ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLES AND COMPARATIVE EXAMPLES

Sample Preparation Procedures

The following materials were prepared for testing for catalytic activity as described below:

Sample 1a—Commercial cobalt powder without modification. The particle size was 2μ.

Sample 1b—Commercial cobalt powder without modification. The particle size was 40μ.

Sample 2a—Two micron cobalt powder treated with water to incipient wetness and dried at 60° C.

Sample 2b—Forty micron cobalt powder treated as in Sample 2a.

Sample 3a—Ten grams of the 2μ cobalt powder was calcined in nitrogen containing 1% oxygen at a gas flow of 2,400 GHSV. The temperature was ramped at 2° C. per minute to 300° C. and held for one hour.

Sample 3b—Ten grams of 40μ cobalt powder treated as in Sample 3a.

Sample 4a—Five grams of the 2μ cobalt powder was treated with a solution of 14.53 g of cobalt nitrate hexahydrate in 6.5 mL distilled water to the point of incipient wetness. Heat evolution was controlled by adjusting the rate of addition and by mixing. At the point of incipient wetness, 2.94 g of the solution had been used. The powder was dried at 60° C. in air and calcined in nitrogen containing 1% oxygen at a gas flow of 4,800 GHSV. The temperature was ramped at 2° C. per minute to 300° C. and held for one hour.

Sample 4b—Five grams of the 40μ cobalt powder was treated as in Sample 4a. A total of 2.21 g of the solution was used at the point of incipient wetness.

Sample 5a—Five grams of the 2μ cobalt powder was treated to the point of incipient wetness with a solution of 14.53 g of cobalt nitrate hexahydrate and 1.29 g perrhenic acid (54% Re) in 5.21 mL distilled water. Heat evolution was controlled by the adjusting the rate of addition and by mixing. At the point of incipient wetness, 2.95 g of the solution had been used. The powder was dried at 60° C. in air and calcined in nitrogen containing 1% as a gas flow of 4,800 GHSV. The temperature was ramped at 2° C. per minute to 300° C. and held for one hour.

Sample 5b—Five grams of the 40μ cobalt powder was treated as in Sample 5a to the point of incipient wetness. The treatment required a total of 2.25 g of treatment solution.

Sample 6—Thirty grams of the 2μ cobalt powder was treated to the point of incipient wetness with a solution of 7.27 g of cobalt nitrate hexahydrate and 0.66 g perrhenic acid (54% Re) in 13.12 mL distilled water. Heat evolution was controlled by the adjusting the rate of addition and by mixing. At the point of incipient wetness, 18.63 g of the solution had been used. The powder was dried at 60° C. in air and calcined in nitrogen containing 1% as a gas flow of 1,300 GHSV. The temperature was ramped at 2° C. per minute to 300° C. and held for one hour.

Sample 7—Thirty grams of the 2μ cobalt powder was treated to the point of incipient wetness with a solution of 3.63 g of cobalt nitrate hexahydrate and 0.32 g perrhenic acid (54% Re) in 17.08 mL distilled water. Heat evolution was controlled by the adjusting the rate of addition and by mixing. At the point of incipient wetness, 9.43 g of the solution had been used. The powder was dried at 60° C. in air and calcined in nitrogen containing 1% as a gas flow of 1,300 GHSV. The temperature was ramped at 2° C. per minute to 300° C. and held for one hour.

Sample 8—Fifteen grams of the 2μ cobalt powder was treated to the point of incipient wetness with a solution of 14.53 g of cobalt nitrate hexahydrate and 3.87 g perrhenic acid (54% Re) in 5.22 mL distilled water. Heat evolution was controlled by the adjusting the rate of addition and by mixing. At the point of incipient wetness, 8.71 g of the solution had been used. The powder was dried at 60° C. in air and calcined in nitrogen containing 1% as a gas flow of 1,600 GHSV. The temperature was ramped at 2° C. per minute to 300° C. and held for one hour.

Sample 9—Ten grams of the 2μ cobalt powder was placed in a solution of 4.00 g of cobalt nitrate hexahydrate in 50.00 mL distilled water. The mixture was stirred for one hour at room temperature, then filtered. The filter cake was dried at 60° C. in air.

Sample 10—Ten grams of the 2μ cobalt powder was placed in a solution of 4.00 g of cobalt nitrate hexahydrate and 0.36 g perrhenic acid (54% Re) in 50.00 mL distilled water. The mixture was stirred for one hour at room temperature, then filtered. The filter cake was dried at 60° C. in air.

Testing Procedure and Results

The samples prepared above were tested for catalytic activity by the following procedure. The tests were conducted in stainless steel, fixed bed reactors at the standard conditions of 200° C. and 285 psig. The catalyst charge to the reactor was between 1.0 and 1.8 g. Due to the exothermic nature of the Fischer-Tropsch reaction, each sample was mixed with a diluent of acid-washed quartz in a weight ratio of at least 8:1 diluent to catalyst. The feed to the reactor was premixed synthesis gas having a molar concentration of 31% carbon monoxide, 64% hydrogen and 5% nitrogen. The reactor effluent was first depressed and then flowed through two traps designed to condense liquid products. The first trap was maintained at 125° C. and the second at 1° C. The gaseous product flowing out of the second trap was analyzed by gas chromatography to determine CO conversion and methane selectivity. CO conversion was calculated by using the nitrogen in the feed as an internal standard. From the CO conversion value, the hydrocarbon productivity can be derived and is expressed as weight of hydrocarbon produced per unit weight of catalyst per unit time.

For all catalysts, an activation step was carried out in pure flowing hydrogen prior to initiating the flow of synthesis gas. A temperature of 350° C. was used as standard temperature for the activation step. A high hydrogen space velocity (40,000 h$^{-1}$) was used during activation to eliminate possible detrimental effects of a high partial pressure of steam, which is formed as the cobalt oxide precursor is converted into metallic cobalt. The activation procedure began by slowly ramping the temperature at 1° C./min to 100° C., which was then maintained for two hours to dry the sample and the temperature again ramped at the same rate to 350° C. and held for three hours.

After activation, the reactor was cooled to 180° C. under flowing hydrogen. Once the temperature was stabilized at 180° C., the pressure was raised to reaction pressure and the feed switched to synthesis gas. The initial exposure of the catalyst material to synthesis gas was done at low temperature utilizing a high space velocity of at least 6000 h$^{-1}$ to prevent harmful effects to the catalyst in an initially hydrogen-rich environment. After approximately 30 minutes at 180° C., allowing some wax to form inside the catalyst pores and achieving a steady hydrogen/carbon monoxide ratio similar to that of the syngas feed, the temperature was ramped at 1° C./3 min to 190° C. and then held for 75 minutes. During this period, the syngas flow was adjusted to achieve a projected CO conversion of between about 50 and 60% at 200° C. The temperature was then ramped at 1° C./3 min to 200° C. and held for the remainder of the experiment. Once this temperature was attained, the flow rate was then adjusted in necessary to achieve the desired CO conversion of between about 50 and 60%. Catalyst productivity, measured in grams of hydrocarbon produced per kilogram of catalyst per hour ($g_{hc}/kg_{cat}/h$) and methane selectivity are reported at the standard time on stream of 5 h after syngas was initially admitted into the system. The results are shown in Table 1, wherein any value given as n.m. was not measurable.

It will be seen from the results reported in Table 1 that only the finer untreated cobalt powder gave a measurable response, the powder impregnated with water had low productivity, the smaller calcined cobalt particles had a higher productivity whereas the larger particles showed no measurable activity. The smaller cobalt particles impregnated with cobalt nitrate solution showed an improvement in production as did the larger ones, but methane selectivity was high for both. The particles impregnated with cobalt and rhenium demonstrated a substantial improvement in catalytic activity, particularly for the two-micron particles and an improvement in methane selectivity as well. Decreasing the concentration of the impregnating solution in Samples 6 and 7 in reference to Sample 5a on the two-micron cobalt particles produced a corresponding drop in productivity. Increasing the rhenium concentration in Sample 8 vs. Sample 5a resulted in an improvement in methane selectivity, but productivity that was not as good as Sample 5a. The latter two samples, 9 and 10, demonstrate the activation of cobalt powder both by immersion and by slurrying in excess activating solution of cobalt nitrate. In each instance there is enhanced productivity and favorable methane selectivity. The promoted catalyst demonstrated a significant increase in productivity with a minor decrease in methane selectivity.

TABLE 1

| Example/Comparative Example No. | Sample Number | Particle size (Microns) | Percent CO Conversion | Productivity ($g_{hc}/kg_{cat}/h$) | % Methane Selectivity |
|---|---|---|---|---|---|
| Comparative 1 | 1a | 2 | 5 | 8 | 12 |
| Comparative 2 | 1b | 40 | n.m. | n.m. | n.m. |
| Comparative 3 | 2a | 2 | 38 | 8 | 6.9 |
| Comparative 4 | 2b | 40 | 2 | <1 | 12.9 |
| Comparative 5 | 3a | 2 | 25 | 22 | 8.8 |
| Comparative 6 | 3b | 40 | n.m. | n.m. | n.m. |
| Example 1 | 4a | 2 | 40 | 37 | 10.6 |
| Example 2 | 4b | 40 | 2 | 1 | 11.2 |
| Example 3 | 5a | 2 | 56 | 259 | 5.2 |
| Example 4 | 5b | 40 | 44 | 35 | 7.6 |
| Example 5 | 6 | 2 | 58 | 63 | 4.7 |
| Example 6 | 7 | 2 | 27 | 22 | 5.0 |
| Example 7 | 8 | 2 | 56 | 105 | 3.1 |

TABLE 1-continued

| Example/ Comparative Example No. | Sample Number | Particle size (Microns) | Percent CO Conversion | Productivity ($g_{hc}/kg_{cat}/h$) | % Methane Selectivity |
|---|---|---|---|---|---|
| Example 8 | 9 | 2 | 47 | 78 | 3.5 |
| Example 9 | 10 | 2 | 75 | 176 | 4.0 |

The results reported in Table 1 clearly demonstrate the advantage of the process of the present invention and the superior catalysts produced thereby. It can be seen from the data in Table 1 that untreated powders of a catalyst metal, such as cobalt, have limited activity and that the larger particle size has lower activity due to smaller surface area for the same weight of powder. Further, it is evident from the impregnation with water that a chemical reaction is necessary to activate the powder. Comparing Samples 2a and 2b shows that water impregnation has no effect regardless of the particle size used. Comparing the Samples 3 with both Samples 2 and 1 demonstrates that activity can be improved by calcination without any other pretreatment, however, as Samples 4a and 4b show, impregnation with a metal (cobalt) and an oxidant (nitrate) produces a marked improvement in activity. The following set of Samples, 5a and 5b, shows that the activity may be further improved by the addition of a promoter metal. The results for Samples 4b and 5b demonstrate that the larger particles, although improved by the treatment, are still inferior to the smaller particles due to their lower surface area to weight ratio. Samples 6 and 7 show that a lower concentration of impregnating solution results in lower catalytic activity. Comparing Sample 8 with Sample 5a shows that activity enhancement by the promoter is dependent of the ratio of promoter to oxidant in the activating solution. Sample 9 demonstrates that activation may be carried out by means other than impregnation, e.g. immersion in the same solution. Finally, Sample 10 demonstrates that, even utilizing immersion as the activating technique instead of impregnation, the addition of the promoter is still of significant benefit in the activity of the result catalyst particles.

What is claimed is:

1. A method for producing a dispersed active metal catalyst comprising:
    a) treating a metal particulate selected from the group consisting of cobalt, zinc, aluminum, manganese, molybdenum, tungsten, chromium, copper, ruthenium, nickel, steel, alloys and mixtures thereof, said metal particulate having a size in the range of from about 0.1 microns to about 5 millimeters, with a solution capable of oxidizing the metal particulate and comprising at least one compound of a hydrogenation catalyst metal selected from the group consisting of nickel, cobalt and ruthenium, the treatment being in an amount and for a time sufficient to form at least one of metal hydroxides and oxides on at least a portion of the metal particulate; and
    b) contacting the treated metal particulate with a hydrogen containing gas at elevated temperature for a time sufficient to reduce the hydroxides and oxides whereby a dispersed active catalyst is produced.

2. The method of claim 1 wherein the metal particulate is particles having a size in the range of from about 1 to 50 microns.

3. The process in accordance with claim 1 wherein said metal of said metal particulate and of said compound are the same.

4. The method of claim 3 wherein said metal particulate is cobalt.

5. The method of claim 1 wherein the weight ratio of oxidizing solution to metal particulate is in the range of about 0.01:1 to about 100:1.

6. The method of claim 1 wherein the solution treated metal particulate is calcined before treating with hydrogen.

7. The method claim 1 wherein said solution includes a compound of one or more members selected from the group consisting of zinc, manganese, titanium, molybdenum, chromium, tungsten, rhenium, ruthenium, palladium and platinum.

8. A method for forming a dispersed active metal catalyst for carbon monoxide hydrogenation processes comprising:
    a) treating a metal particulate having a particle size in the range of about 0.1 microns to about 5 millimeters and selected from the group consisting of cobalt, zinc, aluminum, manganese, molybdenum, tungsten, chromium, copper, ruthenium, nickel, steel, alloys and mixtures thereof, with a solution capable of oxidizing the metal particulate and comprising at least one compound of a metal selected from the group consisting of nickel, cobalt and ruthenium, the treatment being in an amount and for a time sufficient to form at least one of metal hydroxides and oxides on at least a portion of the metal particulate;
    b) drying the treated particulate;
    c) calcining the dried particulate; and
    d) contacting the calcined particulate with a hydrogen containing gas for a time sufficient to reduce the hydroxides and oxides whereby a dispersed active catalyst is formed.

9. The method in accordance with claim 8 wherein said solution in the treatment step a) includes one or more members selected from the group consisting of nitrates, nitrites, nitrosyl compounds and peroxides.

10. The method in accordance with claim 9 wherein said metal of said metal particulate and said compound is cobalt.

11. A dispersed active metal catalyst produced by the process of claim 1 or claim 8.

* * * * *